United States Patent [19]

Lewis et al.

[11] Patent Number: 5,594,945
[45] Date of Patent: Jan. 14, 1997

[54] METHOD OF PROVIDING REGISTRATION REMINDER MESSAGE TO A ROAMING PAGER UPON ENTRY INTO A NEW SERVICE AREA

[75] Inventors: John E. Lewis, Lawrenceville; Peter O. Roach, Jr., Doraville, both of Ga.; Thomas Poulos, Madison, Miss.

[73] Assignee: BellSouth Corporation, Atlanta, Ga.

[21] Appl. No.: 388,361

[22] Filed: Feb. 14, 1995

[51] Int. Cl.$^6$ ............................... H04B 7/26; H04Q 7/08
[52] U.S. Cl. ................. 455/38.1; 455/54.1; 340/825.44; 379/57
[58] Field of Search ................................. 455/33.1, 33.3, 455/34.1, 54.1, 56.1, 62, 63, 67.1, 38.1, 38.2, 33.2, 54.2; 340/825.44, 825.49, 825.36; 379/56, 60, 57

[56] References Cited

U.S. PATENT DOCUMENTS 5,254,986  10/1993  DeLuca ........................... 340/825.44
5,301,357  4/1994  Thompson ............................. 455/54.1
5,305,466  4/1994  Taketsugu ............................. 455/33.1

Primary Examiner—Chi H. Pham
Attorney, Agent, or Firm—Jones & Askew

[57] ABSTRACT

A method of delivering registration reminder messages in a segmented nationwide or other broad area paging system, having multiple service areas, is disclosed. A set of unused capcodes is assigned on a one to one basis as service area codes for each of the service areas. Each service area transmits a set of messages addressed to all service areas except the local service area. Existing paging equipment with alternate capcode memories for storing an alternate address are employed. When a service area code matches the alternate capcode address in the pager, the reminder message is received and displayed. When the user subsequently registers, a command message is transmitted from the local service area commanding the pager to change its alternate capcode to the local service area code. Since no reminder message is addressed to the local service area code is transmitted, receipt of reminder messages then terminates.

13 Claims, 2 Drawing Sheets

5,594,945

METHOD OF PROVIDING REGISTRATION REMINDER MESSAGE TO A ROAMING PAGER UPON ENTRY INTO A NEW SERVICE AREA

TECHNICAL FIELD

The present invention relates to the art of operating a segmented nationwide paging system, and in particular is a method of notifying a paging device that has moved into a new service area that the user should register the paging device in the new service area.

BACKGROUND OF THE INVENTION

Since first coming into use in the 1970's, over the air personal paging devices have become very popular in the United States and other countries. Generally, a paging device is a small, portable, addressable, radio frequency receiving device that may be easily carried on a person, for receiving some form of message over the air anywhere within the coverage area of the transmitting apparatus for the paging system with which the device is associated. Earliest forms of pagers were addressable devices that were simply activated by a transmitted message containing address information specifically directing it to the pager. The earliest devices simply beeped or vibrated to alert the user that a message had been received, and were often referred to as "beepers" in the common vernacular. The user would normally take a predetermined action, such as calling his or her office, when the pager was activated. Early paging systems tended to cover major metropolitan areas but there was no mechanism, save acquiring multiple pagers, for making a person pagable in a number of different cities.

More recent innovations include digital and voice pagers, whereby encoded messages to call specific telephone numbers and short segments of audio are actually transmitted to the pager. Still more recently pagers for receiving, storing and displaying more lengthy alphanumeric messages have come into use.

The needs of many businesses to be able to contact individuals who travel throughout the United States has lead to the allocation of spectrum by the Federal Communications Commission to three nationwide paging systems. A nationwide paging system is one for which a subscriber may obtain a pager through which the subscriber may be contacted in any one of many metropolitan areas throughout the entire United States. One such nationwide paging system in the United States is operated by Mobile Communications Corporation of America ("Mobil Comm"), a subsidiary of the assignee of the present invention, and is known as its CityLink service.

The addressability of a pager is determined by a unique identifier or code stored within the pager that may be considered analogous to a telephone number. For historical reasons it is referred to as a "capcode" since in early paging devices, a code number was printed on a cap that fit on top of the pager. Modern paging devices used in nationwide paging systems received bilevel frequency shift keyed (FSK) encoded signals in the 930 MHz band and normally provide a single line alphanumeric display for displaying alphanumeric messages and numeric messages indicating a phone number to call. They also provide storage of multiple messages in memory for later review.

Existing paging devices used with the CityLink system, such as the apparatus currently manufactured by Motorola Corporation as its Advisor brand pager, can store both the pager specific unique capcode and an alternate capcode, also referred to as a message code, that allows the pager to decode messages with an alternate address. This is used, for example, for sending the same message to a class of recipients, such as the sales force of a corporation wherein pagers used by all sales force personnel will have the alternate capcode programmed to the same number. Additionally, such existing pagers have the ability to change the alternate capcode in response to over-the-air commands embedded in message streams generated by the paging system.

In the United States, the nationwide paging systems are of two types. In a first type of system, a message transmitted to a subscriber is distributed to all transmission facilities throughout the country and is transmitted by each facility so that if the addressed paging device is within a coverage area of one of the transmitters, the message will be delivered to the subscriber's pager. This type of system is most convenient to the user as he or she may simply turn on their paging device in any location within the coverage area of a transmitter for such a system and receive message without any further attention. However, it will be apparent from considering the architecture of such a system that the great majority of the message capacity of the system is wasted in the sense that each message is transmitted by every transmission facility in the system, but only one of them will actually deliver the message to the user's pager. Therefore, the substantial majority of the message traffic of any given transmitter will normally be occupied by messages addressed to pagers that are not within the coverage area of the transmitter. The natural result of this is that subscriptions to this first type of nationwide paging service tend to be relatively expensive.

The second of type of nationwide paging system is one for which the same paging device may be used in any coverage area within the system, but requires the user to notify the system of his or her location so that messages directed to that user will only be sent by transmission facilities in one particular area. The CityLink nationwide paging service is an example of the second type. Such a system is referred to as a segmented system in this specification. In this type of nationwide paging system each coverage area is referred to as a service area, and generally corresponds to a major metropolitan area within the United States. The entire system is composed of the collection of all coverage areas and the interconnecting links therebetween.

The user of such a system must register the presence of his or her pager in the service area in which it is located in order to received messages in that service area. Once registration is accomplished, a central message switching center receives all messages to be delivered to subscribers, maintains a record of the service area in which the subscriber last registered his or her pager. The message is then routed to transmission equipment in the appropriate service area and is ultimately transmitted by the transmission facility only within that service area.

From this, the basic trade off between the two types of nationwide paging systems will be appreciated. In a segmented paging system, the transmission facilities in all other service areas (save the one in which the user has registered) are not encumbered by sending messages to paging devices that are not within their service areas. Thus there is a very significant diminution in the amount of wasted message capacity in a segmented system. This improvement in capacity usage is obtained at the price of slight inconvenience to the subscriber, i.e., requiring the subscriber to register the presence of his or her pager is a service area as the paging device is moved out of one service area and into another.

However, the great increase in utilization of capacity of the system allows the second type of service to be offered at less expensive rates than the first type nationwide paging system.

Experience with a segmented nationwide paging system has indicated that from time to time subscribers are not mindful of the requirement that they register their paging device when they enter a new service area. Registration is typically accomplished by calling a toll free (800) number, putting in a personal identification code, and letting the system know the service area in which the subscriber's paging device is now located. This information is used to update an address record indicating the current service area location for each pager in the system. When an incoming message to a particular subscriber is received at the message switching center, this information is consulted and the message is forwarded to the transmission facility at the indicated service area for transmission over the air.

When a user travels from one city to another, she will not receive her messages if she fails to register the presence of her pager in the new service area. The registration process is cost free to the user (a toll free call) and quick. It is therefore believed that failure to register upon moving to a new service area is often caused by the subscriber simply forgetting to register his or her pager. Often, beginning a day in a new city can be physically stressful if time zones have been crossed, and many times important business is the first order of the day.

Therefore, there is a need for a system that can effectively identify a subscriber to a nationwide paging service that is located in a particular service area, that has not registered in that service area, and will thus not receive messages. It is desirable for both the paging service provider as a way of increasing revenue, and for the subscriber/user so that the maximum utility from the subscription to the paging system may be obtained. It further desirable that a system for reminding the subscriber to register will generate reminders only as long as the pager is active but has not been registered in the service area so that the subscriber does not become annoyed by repeated messages requesting that the pager be registered when in fact registration has taken place.

Systems for contacting roaming cellular telephones and inquiring whether the user is interested in registering as a roamer have been previously invented by a personnel of the assignee of the present invention. However, such systems identify the roamer status of the cellular phone by information (the telephone's identification number) that is transmitted from the telephone to a cell site when the telephone autonomously registers upon entry into a new cell site. Since there is no pager to system communication for conventional paging devices, there is no similar ability to identify roaming pagers. Thus, there is no way to truly identify the presence of a roaming receive only pager in a segmented nationwide system.

It is known in the prior art to make paging devices that are specifically designed to automatically work with multiple paging systems. U.S. Pat. No. 5,196,842 to Gomez et al. describes a scanning paging device, specifically designed for use with multiple paging systems currently used in the United Kingdom. A system specific idle word is assigned to each of a plurality of separate and distinct paging systems and the idle word is transmitted at a predetermined location in a message header uniformly by multiple systems. The paging device shown in Gomez includes a table of unique idle word identifiers corresponding to the paging systems for which the user is a subscriber. So long as the unique idle word matches the stored identifier for the paging system presently in use, the pager continues to respond to messages for the identified system. When a message header is received with a unique idle word identifying another system, the Gomez device will scan its memory of authorized systems, and if a match is found, switch its configurations for the newly identified system. It also has the capability of scanning multiple frequencies used by different paging systems.

While a device such as the pager of Gomez could be used to implement an automatic switching pager for a segmented nationwide paging system, such implementation could only be made prospectively by changing the installed base of pagers from of the type currently used to the newer types such as those shown in the Gomez '842.

U.S. Pat. No. 4,644,347 to Lucas et al. shows a scanning type pager that is designed to operate on both local system frequencies and a frequency used by a non segmented nationwide system. A special code identifying that a message is transmitted on a local system is embedded in the message. When this code is detected by pager apparatus, it remains listening on the local frequency. When the special code is absent from a message format, the device assumes it has been moved to an area foreign from its home local system and automatically switches to receive messages on a non segmented nationwide system. While the device shown in Lucas '347 could also address the problem of inattention to registration in a segmented nationwide system, it, like Gomez, requires new paging devices to be used in the field.

Thus, there is a need in the art of operating a segmented nationwide paging system to provide a method of providing a reminder messages to non registered pagers that have moved into a new service area that the user should register in the new service area. This system should be usable with existing paging devices, and not generate reminders after registration is accomplished.

SUMMARY OF THE INVENTION

The present invention fulfills the above described need. Broadly stated, the present invention is one that provides a set of unique identifiers, associated on a one to one basis with the service areas of segmented nationwide paging system. Naturally, the same principles apply to any segmented paging system covering any given territory, so long as it has plural distinct service areas and a switching center that directs messages intended for a particular subscriber only to a subset of the services areas.

Broadly stated, the method of the present invention comprises the steps of assigning a unique paging device address code, i.e., an unused cap code, to each of the service areas of the segmented system. In at least one of the service areas, the transmitting facility repetitively broadcasts a set of reminder messages requesting the recipient to register in the service area. The members of the set of reminder messages are addressed to devices that include the paging device address code for each service area of the system except the local service area, i.e., the service area served by the transmitter sending the messages. Each of the assigned paging device address codes that corresponds to a service area is referred to as a service area code in this specification. As will become apparent from the description below, current paging devices have an alternate cap code storage capability will start with the service area code for the subscriber's home service area stored therein.

The characterization of "repetitive" broadcasting of the reminder messages should not be taken as a requirement that each reminder message associated with a particular service area is broadcast with equal frequency or periodically. It simply means that from time to time each member of the set that is broadcast will be repeated. In its most preferred form, the present invention broadcasts the entire set repetitively in the same sequence. However, the selection of times for such broadcasts may be modified in response to current level of revenue generating message traffic in the system. Also, experience may indicate that it is preferable to broadcast certain members of the message set more often than others if information about the demographics of out of town users in a given service area indicates that a large volume of users from particular distance service areas tend to come into the local service area.

A next step in the preferred embodiment of the present invention follows after a subscriber responded to the request for registration and registered in the local service area. The paging system of the preferred embodiment then causes the local service area transmission facility to send out a coded command message addressed to the pager specific capcode for the subscriber's pager. In this message is a command that the pager change the alternate cap code stored in memory to the paging device address code that has been specifically assigned to the local service area in the first step of the method. Since the local service area is transmitting reminder messages addressed to the service area codes associated with all other service areas, but not associated with itself, all of the reminder messages subsequently received by the user's pager are then ignored since the address for the message matches neither the pager's specific individual cap code or the service area code stored in the alternate cap code memory. In this way, the system terminates receipt of the registration reminder messages by the pager once the user has registered it in the local service area.

The same sequence occurs when the user returns the pager to the home service area. Since the service area code stored in alternate cap code memory corresponds to the foreign service area recently vacated when the user returned home, one message from the home service area set of reminder messages will be addressed to that particular foreign service area. These messages will be received and decoded by the pager, reminding the user to re-register in the home system. When this accomplished, the home service area transmission equipment send a similar command specifically addressed to the user's pager commanding change of the alternate cap code memory to the service area code associated with the home service area. When this is completed decoding the storage of reminder messages terminates.

In this way the paging system of the present invention implements a method of transmitting reminder messages to pagers that are subscribers to a segmented national system, but unregistered in the local service area whereby newly arriving pagers not registered in the service area are alerted with reminders to register. Upon registration, decoding of the reminder messages terminates. To the user, it appears that the system has detected the presence of the unregistered pager and further responded to the registration since decoding of reminder messages terminates after registration. It should be noted that all of this is accomplished with existing transmission facilities and existing paging devices, such as those used in the Mobile Comm, CityLink segmented national paging service. Neither new message formats nor replacement of existing pager equipment is required to implement the method.

It is believed that it may be preferable to transmit the command message to a subscriber's pager commanding change of the alternate capcode memory contents to the local service area code multiple times in response to each registration to increase the probability that the command message is actually received and acted upon.

Naturally, it is preferred that the method be implemented in all service areas of a segmented paging system but it can be practiced by only implementing it in some, for example large metropolitan areas that have significant influxes of business travelers who are likely to be subscribers to a paging system.

Therefore the present invention accomplishes the objects set forth above and does so with respect to devices that do not autonomously register or communicate their identification directly to a transmission facility as is done in a cellular telephone system.

Therefore it is an object of the present invention to provide a method of delivering registration reminder messages to unregistered pagers transported into a particular service area from another service area which messages are decoded and reproduced by the pager without any notification being provided to the paging system that a new foreign pager has arrived in the service area.

It is a further object of the present invention to provide a method of delivering registration reminders that terminate decoding of the reminder messages once the user has registered the presence of the pager in the new service area.

It is still a further object of the present invention to provide a method of delivering registration reminder messages for roaming electronic message receiving device that provides no over the air identification of itself to the transmission facility that delivers messages to same.

It is still a further object of the present invention to provide a registration reminder message delivery system for a segmented paging system that behaves as if the pager autonomously notified the system of its presence in a new service area that can be implemented without any change to message format or requirements of new physical characteristics for pagers used by the system.

That the present invention accomplishes these objects and fulfills the need in the prior art identified above will be apparent from the detailed description of the preferred embodiment to follow.

DETAILED DESCRIPTION OF THE PREFERRED EMBODIMENT

Figure 1:
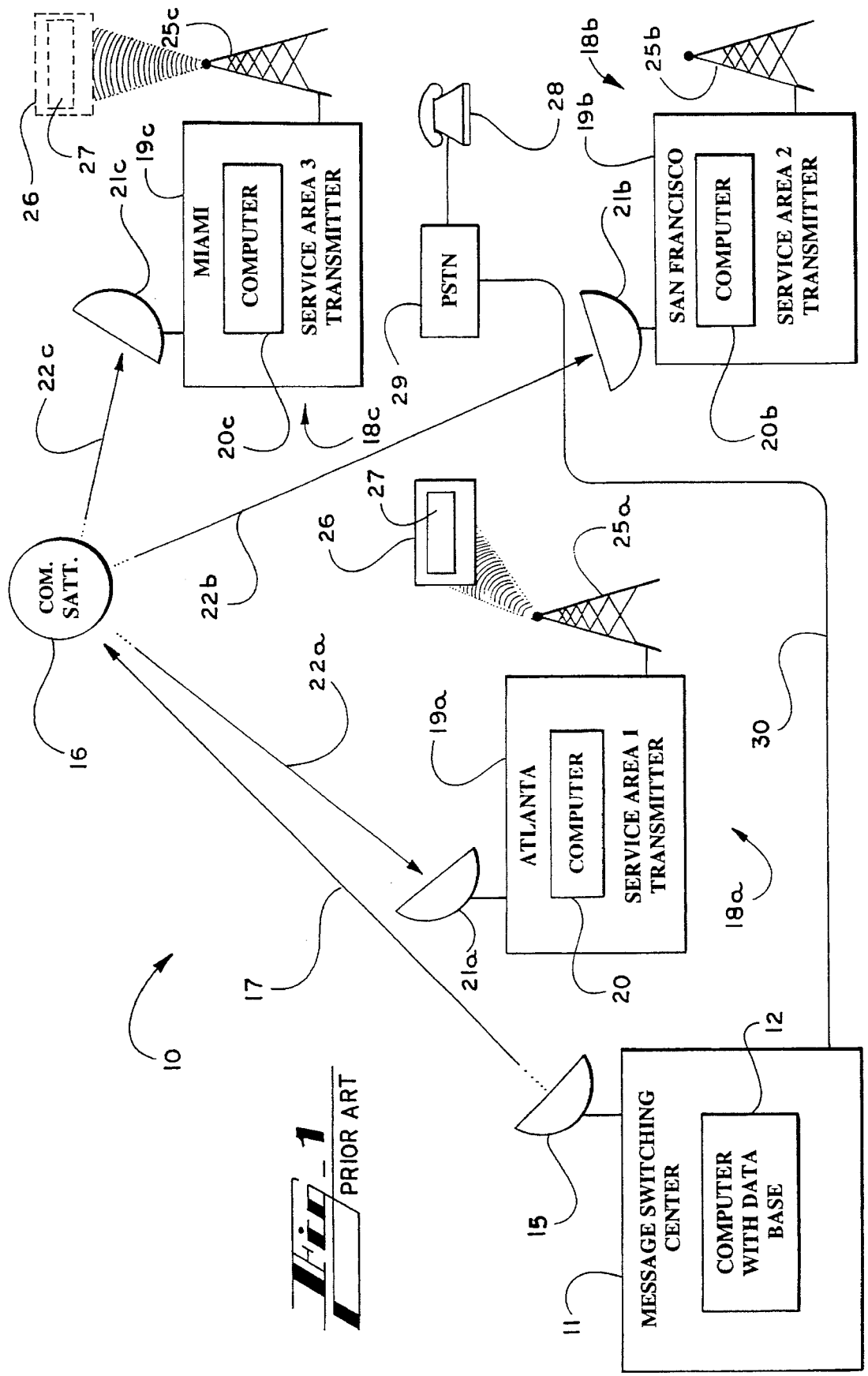
FIG. 1 is a diagram of a simplified segmented paging system implementing the present invention.

Turning now to the drawing figures in which like numerals reference like devices and steps, the preferred embodiment of the present invention will now be described. Turning to FIG. 1, a simplified representation of a segmented national paging system 10 is shown. As noted on FIG. 1, the apparatus of the paging system is, per se, part of the prior art. The example used to describe the present invention is a three city segmented paging system although it should be understood that practical implementations of paging systems usually cover a much larger number of cities and therefore have a larger number of service areas. For example, the CityLink nationwide paging system operated by Mobile Comm, has 121 service areas as of the writing of this specification.

A message switching center 11 includes a computer 12 that includes a subscriber database that maintains records of all subscribers on the system, the capcodes for the subscriber's pagers and an indication of the service area in which the pagers are currently registered. Messages are typically provided by modem or other device over the public switched telephone network by dialing a toll free number that sends messages to computer 12 at the message switching center 11. Alternatively, the traditional function of digital pager can be implemented by connecting to equipment at the message center that includes dual tone multi-frequency (DTMF) detectors that allows the caller to input a telephone number to be called or other numeric message via operation of a touch tone keypad. Also, digitized voice segments may be stored for voice paging functions.

Communication between message switching center 11 and transmission facilities at various service areas is preferably accomplished through an antenna 15 that establishes an up link with communication satellite 16. Arrow 17 in FIG. 1 represents the up link. While use of satellite communications is preferred, terrestrial microwave, fiber optics, and any other form of data transmission facility can be used to establish communications between message switching center 11 and various service area facilities.

In the three city example used in the present specification, the three metropolitan service areas, indicated as 18a–18c, are Atlanta, San Francisco, and Miami, respectively. These are also referred to as service areas 1–3 in the vernacular of the present specification. Each of the common components within the service areas is identified in the specification with the same reference numeral followed by suffixes a–c, depending on the particular service area in which the device resides. Each service area has a transmission facility, generally indicated at 19 that is controlled by a computer 20 that receives, and queues messages, and controls the transmission thereof. While shown as a single transmission facility in the drawings, those skilled in the art will understand that a typical metropolitan area transmission facility for a paging system will include multiple transmitters, typically 50 or more. It likewise receives messages on a down link from communication satellite 16 that are routed to it from message switching center 11. The service area transmitters communicate with communication satellite 16 via antenna 21 on down links indicated by arrows 22a–c.

Communications from service area transmitters 19 to individual pagers occurs over the air via transmission tower 25. As noted hereinabove, the existing CityLink segmented national paging system operates in the 931 MHz band using two level frequency shift keyed (FSK) modulation to encode data. A typical pager 26, which includes a multi-line LCD alphanumeric display 27 is shown as residing within the first service area 18a. It is shown in phantom in the third service area 18c. Implementation of the method and the response of pager 26 will discussed in connection with the example given hereinbelow.

Figure 2:
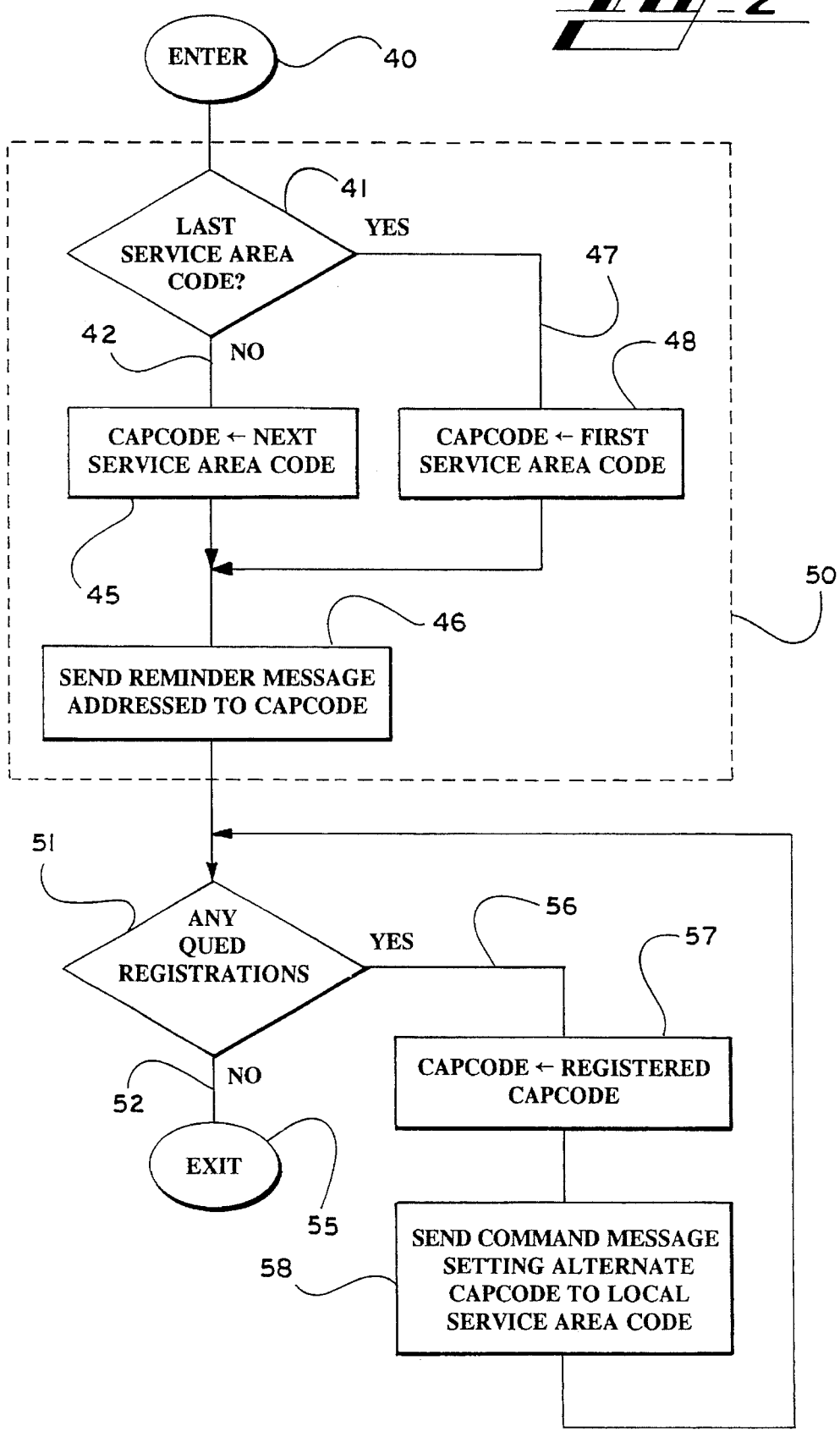
FIG. 2 is a flow diagram of the logical steps executed by a computer at a particular service area transmission facility practicing the present invention.

FIG. 2 shows a flow chart of the logical steps of the method of the preferred embodiment. In the environment of the preferred embodiment illustrated in FIG. 1, the steps of FIG. 2 are performed on computers 20a–20c and with the associated data encoding and radio frequency transmission equipment apparatus at service area transmitters 19, all of which is existing equipment that will be familiar to those skilled in the art.

FIG. 2 shows the routines for transmitting sets of registration reminder messages and alternate capcode changing commands that constitute the preferred embodiment. As described hereinabove, each service area transmits a set of preferably identical registration reminder messages addressed to the unique paging address code associated with all other service areas. The following tables show a representative example of the assignment of unique paging device address codes for each service area and the addresses used in the sets of registration reminders in each service area.

TABLE 1

Assignment of Service Area Codes

| Service Area | Service Area Code (Alternate Capcode) |
|---|---|
| 1 — Atlanta | 0000001 |
| 2 — San Francisco | 0000002 |
| 3 — Miami | 0000003 |

TABLE 2

Sets of Service Area Codes for Reminder Messages

| Service Area 1 (Atlanta) | Service Area 2 (San Francisco) | Service Area 3 (Miami) |
|---|---|---|
| 0000002 | 0000001 | 0000001 |
| 0000003 | 0000003 | 0000002 |

As is shown in Table 1, service area 1 is designated with a capcode 0000001. Similarly, the San Francisco service area (service area 2) is assigned code 0000002, and Miami is assigned 0000003.

In the simplified example of this specification, there are only three service areas. Since each service area transmits a set of reminder messages addressed to all other service areas, each of the service areas will repetitively send a set of two reminder messages. In the general a segmented system having N service areas will perform the preferred embodiment by having each service area send N−1 messages as the set of reminder messages. Table 2 shows the service area codes used to address each of the reminder messages in a set. Note, for example, that Atlanta, which is designated by service area code 0000001, sends messages addressed to service area code 0000002 and 0000003, but not to itself. Table 2 shows that the other two service areas likewise send at least one message addressed to each paging device address code for each of the plurality of service areas, except for the particular one in which the transmitter is located.

In the process of selecting the unique paging device address codes that designate each service area, no code previously assigned to an individual paging device is used. Therefore one of the transmitted messages in each service area will be decoded by all pagers having a valid service area in their alternate capcode memory other than the local service area code. This is assured because the preferred form of the present method addresses the message to all service area codes other than the local service area.

With this in mind, the logical steps shown in the flow chart of FIG. 2 will now be described. Entry into the routine is made at entry point 40. It is preferable that this be invoked by an internally generated timed interrupt, but any method of assuring that the messages are delivered at appropriate intervals may be used to implement embodiment of the present invention. At step 41, a test is made to determine if the last service area code in the set of service area codes used for addresses for the reminder messages has been reached. If it has not, no branch 42 is taken to step 45 at which the variable CAPCODE is replaced by the next service area code. In the flow chart of FIG. 2 the variable CAPCODE is the address field for the outbound message. The routine then moves to step 46.

If the last service area code has been reached, yes branch 47 is taken to step 48 at which the variable CAPCODE is replaced by the first service area code, and the cycle of sending the set of messages will be recommenced. When this done, the routine likewise moves to step 46.

At step 46 a reminder message is sent to the address designated by the variable CAPCODE. Assume for example that the routine FIG. 2 is being performed in service area 1, i.e., Atlanta. Further assume that the variable CAPCODE has been set 0000002 at the time step 46 is executed. When this message is transmitted at step 46, all subscribing pagers that are active and have service area code 0000002 stored in the alternate capcode memory will receive and decode the message. These pagers are those that have last come from the San Francisco service area. Thus all newly arrived pager subscribers from San Francisco with active pagers will receive and decode the reminder message. A reminder message will typically be something on the order of a welcome message followed by a polite request to register the pager's presence in the Atlanta service area, together with the toll free telephone number that the subscriber can call to accomplish this.

Naturally, other types of messages, in terms of verbal content, may be transmitted, either repetitively, or in some form of interlaced fashion. The messages can contain advertising in addition to an indication that the subscriber should register in the local service area. This is an opportunity to generate revenue for the paging system operator that will tend to offset the cost of using message traffic capacity for practicing the method of the present invention. It should thus be understood that the set of reminder messages referred to in this specification is specifically directed to sets of messages for nonlocal service areas that may vary in substantive content.

Note that the steps described heretofore are surrounded by dashed line 50 in FIG. 2. It should be understood that while not constituting the entirety of what the inventors believe to be the best mode, the steps within dashed line 50 are believed to constitute an invention per se, even though repeated execution thereof would continue to send reminder messages to pagers that are registered in the local service area.

Continuing with the description of the preferred embodiment, after the reminder message is sent it is convenient to test whether there are any queued indications indicative of new registrations. This is accomplished at decisional step 51. It should be noted here that registration is accomplished via telephone 28 that provides a message to switching center 11 (FIG. 1). Switching center 11 sends a message over satellite link 17 to communication satellite 16, which will in turn send the message on appropriate one of down links 22 to the local service area indicating that a particular pager has just registered as being present in the local service area. The computer 20 associated with service area transmitter 19 in the local area will queue up a message internal to the computer indicating the capcode for the newly registered pager. It is the presence of any such queued indications of new registrations that is tested for at step 51. If there are no newly queued registrations, no branch 52 is taken to exit point 55 and computer 20 returns to its other tasks.

If any newly queued registrations are stored in computer 20, yes branch 56 is taken to step 57 in which the variable capcode is replaced by the newly registered capcode taken from the list detected at step 51. For example, if the user has registered his or her pager that has capcode 1234567, the variable CAPCODE will be set equal to 1234567. This will cause a message using that capcode in the address field to be decoded only by that user's particular pager. At step 58 a command message is sent to the particular pager commanding that the alternate capcode be changed to the local service area code. When this is accomplished, the pager will respond only to messages addressed to its specific capcode (1234567) and those addressed to the local service area code. Since the local service area is transmitting reminder messages to addresses consisting of all of the other service area codes, but not the local one, no more reminder messages will then be displayed by this particular pager.

It should further be noted that it is not necessary to perform step 51–58 as part of the same interrupt service routine at which reminder messages are sent. It is only convenient, and shown as associated with that routine herein in order to illustrate the methodology of the present invention. The transmission of the command messages may be entirely independent of the transmission of reminder messages.

It is preferable to transmit the entire set of reminder messages approximately once every fifteen to sixty minutes. It also may be desirable to queue multiple command messages that will be transmitted per step 58 in order to increase the probability that the command message will be received, decoded, and acted upon. Since the pagers do not acknowledge receipt of command messages, it may be desirable to redundently transmit same, spaced apart in time, in order to assure a higher probability of changing the alternate capcode for the pager device.

Having described the preferred embodiment of the present invention, an example will be discussed in connection with the drawing figures. The reader's attention is first directed to the following Table 3 that designates five time periods T1–T5. The table further gives the location of a particular pager, the capcodes to which it responds, and explains the actions of the user and the response of the pager.

TABLE 3

| Time | Location | Capcodes | User Action/Pager Response |
|---|---|---|---|
| T1 | Atlanta (S.A.1) | 1234567<br>0000001 | No Reminder messages displayed |
| T2 | Miami (S.A.3) | 1234567<br>0000001 | User arrives Miami — Reminder messages addressed to 0000001 displayed |
| T3 | Miami (S.A.3) | 1234567<br>0000003 | User Registers, Command message sent to capcode 1234567 setting alternate capcode to 0000003 (Service Area 3 code) No reminder messages displayed |
| T4 | Atlanta (S.A.1) | 1234567<br>0000003 | User returns to Atlanta messages addressed to 0000003 displayed |
| T5 | Atlanta (S.A.1) | 1234567<br>00000001 | User Registers, Command message sent to capcode 1234567 setting alternate capcode to 0000001 (Service Area 1 code) No reminder messages displayed |

The example begins with pager 26 located in service area 1, i.e., the Atlanta area 18a as shown in FIG. 1. Pager 26 is a known paging device such as the Advisor brand pager currently manufactured by Motorola Corporation that has a setable predetermined pager specific capcode (i.e., address code) and programmable alternate capcode stored in an alternate capcode memory. Since the step of assigning unique paging device address codes to each service area will be assumed to have already have been performed, pager 26 begins service with a unique paging device address code (i.e., the service area code) of its home service area stored in the alternate capcode memory. Thus, reference to Table 1 shows that service area code 0000001 is stored in the alternate capcode memory. The column labeled "Capcodes" in Table 3 shows the contents of the pager's specific capcode and the programmable alternate capcode memory. In the example, it is assumed that the pager's specific capcode (i.e., the pager's address) is 1234567. Note from Table 3 that this never changes.

As the subscriber moves about service area 18a, that is the Atlanta area, the pager receives and decodes messages addressed to capcode 1234567. Reference to Table 2 shows that code 0000001 is not among the set of addresses used for the reminder messages in service area 1, and therefore no reminder messages are displayed, as indicated in Table 3.

Next, assume that user takes pager 26 into service area 3, as indicated in phantom in FIG. 1. This may be done, for example, by taking a business trip to the Miami area. At time T2 shown in Table 3, the user arrives in Miami and the contents of the alternate capcode memory remains unchanged, i.e., the service area code for Atlanta, 0000001. Reference to Table 2 shows that the Atlanta service area code 0000001 is one of the addresses to which reminder messages are sent since the set of service area codes used to address the reminder messages includes addresses for all other services areas. As indicated in Table 3 the transmission of reminder messages with address 0000001 from service area transmitter 19c will cause these messages to be decoded by pager 26 and displayed in display 27. As noted hereinabove, the reminder message will typically welcome the user to Miami and provide information on a toll free number or a local number at which the user can call to register.

Assume now that at time T3 the user responds to the message and indeed places a phone call to register the presence of pager 26 in the Miami area. As indicated in FIG. 1, telephone set 28 coupled to the public switched telephone network 29 is used to generate a message, preferably through dual tone multi-frequency (DTMF) signaling over connections represented by line 30 to the message switching center 11. Registration is accomplished by an existing process of telephoning a toll free number, entering a user's personal identification number (PIN) and indicating where the user is located. This is an interactive process prompted by recorded spoken segments supplied from switching center 11.

Alternately, registration can be accomplished via serial data communications conducted through a modem and the public switched telephone network to data ports terminated by modems in switching center 11. The registration process is per se conventional, and known to those skilled in the art.

The registration process updates records in the database of computer 12 at message switching center 11 indicating that the pager with capcode 1234567 is now present in the Miami service area 18c. Additionally, as indicated in Table 3, at time T3 a command message is transmitted via transmitting tower 25c (step 58, FIG. 2), addressed to capcode 1234567, commanding the paging device to change its alternate capcode in alternate capcode memory to the local area service code, i.e., 0000003. This is reflected in the capcodes column at time T3 in Table 3. As note hereinabove, it may be preferably to send this command several times, possibly spaced apart in time by several minutes or hours, to increase the probability of its receipt, decoding, and execution by pager 26. Note that if the command is executed multiple times, there is no change in the ultimate result. Also, receipt and execution of these commands does not cause any alert to be given the subscriber. Thus, there is no subscriber annoyance from multiple transmissions of the commands. For the duration of the user's stay in Miami service area 18c, no reminder messages are decoded and displayed as none are addressed to either of the two capcodes to which pager 26 is set to respond at time T3.

At time T4 indicated in Table 3, assume that user returns to Atlanta and thus pager 26 is now back in service area 1. Upon arrival in Atlanta, the contents of the alternate capcode memory remains unchanged as indicated in Table 3. Reference to Table 2 shows that capcode address 0000003 is one of the addresses to which reminder messages are sent in the Atlanta service area, and therefore pager 26 will start to receive and decode this message, reminding the user to re-register in the home service area. At time T5, assume that the user registers, as described hereinabove with respect to registration in Miami at time T3. A command message is sent via transmission tower 25a commanding changing of the alternate capcode address to the service area code for Atlanta, i.e., 0000001. This terminates the decoding of reminder messages while in the Atlanta area. References to Table 3 shows that it reestablishes the state of the capcodes at time T5 as they existed at time T1.

The foregoing has been a full and complete description of what the inventors believe to be the best mode of the method of the present invention. From the foregoing description will be appreciated the present invention accomplishes the objects set forth hereinabove and fulfills the need in the prior art previously described. While the environment that gave rise to the motivation for making the present invention was a segmented nationwide paging service, it should be understood that any segmented paging service that transmits messages only to a subset of its service areas can make use of the present invention. Furthermore, the present invention could be used in an environment for multiple paging system for pagers that would respond to messages on multiple paging systems where each separate paging system, normally at a different locale, corresponds to a service area as described in the environment that gave rise to the invention.

Naturally, there is overhead associated with the practice of the present invention but it is believed to be well within practical limits. If, for example, a practical segmented system had 100 service areas the first step of the method would be to assign 100 unique unused capcode to be the service area codes. Each service area would need to send a set of 99 reminder messages to complete the cycle. If the set of messages is to be transmitted twice an hour, so that each unregistered pager will receive a reminder approximately once every half hour, 198 pages per hour will be required in each service area. If a 20% call rate is assumed for customers, an extra 198 pages per hour is a load on the system equivalent to approximately 990 additional nationwide paging customers. It is believed that an increase in revenue from message traffic for existing customers will register in response to the messages, and might otherwise forget to register when moving to a new service area, will offset the overhead associated with this use of transmission capacity for the reminder messages.

Naturally, other information, such as notification of upcoming events in the city and promotional messages could be included in the reminder messages. Promotional messages may also be transmitted and be a source of revenue to the paging system operator. While the present specification has discussed decoding of messages for display in display 27, it is within the scope of the present invention to employ paging devices that accept other output formats including audio segments and displays of telephone numbers. For example, verbal prompts to register could be delivered as all of part of the registration reminder messages in an embodiment of the present invention.

An additional benefit to subscribers is that they will be effectively apprised of the progress of travels when taking a long trip, for example, by airplane. If the subscriber chooses to leave his or her pager on, the receipt of welcome messages from different service areas provides an informal way to track a subscriber's progress on an extended trip.

In view of the foregoing description, other embodiments of the present invention may suggest themselves to those skilled in the art. Therefore, the scope of the present invention is to be limited only by the claims below and equivalence thereof.

We claim:

1. A method of operating a paging system comprising a plurality of service areas comprising the steps of:

assigning a unique paging device address code to each of said plurality of service areas; and in at least one particular one of said plurality of service areas, repetitively broadcasting a set of reminder messages requesting recipient registration, said set of reminder messages including at least one message addressed to said paging device address code for each of said plurality of service areas except said particular one of said plurality of service areas.

2. A method of operating a paging system as recited in claim 1 wherein:

said repetitive broadcasting of said set of reminder messages requesting recipient registration occurs in each particular one of said plurality of service areas.

3. A method of operating a paging system as recited in claim 1 wherein:

said paging system transmits a command message addressed to a particular paging device in said particular one of said service areas, commanding said particular paging device to change a secondary capcode value to said unique paging device address code for said particular one of said service areas in response to each said registration communicated by a user.

4. A method of operating a paging system as recited in claim 2 wherein:

said paging system transmits a command message addressed to a particular paging device in said particular one of said service areas, commanding said particular paging device to change a secondary capcode value to said unique paging device address code for said particular one of said service areas in response to each said registration communicated by a user.

5. A method of operating a paging system as recited in claim 1 wherein:

said step of repetitively broadcasting said set of reminder messages requesting recipient registration is performed at regular intervals.

6. A method of operating a paging system as recited in claim 2 wherein:

said step of repetitively broadcasting said set of reminder messages requesting recipient registration is performed at regular intervals.

7. A method of operating a paging system as recited in claim 3 wherein:

said step of repetitively broadcasting said set of reminder messages requesting recipient registration is performed at regular intervals.

8. A method of operating a paging system as recited in claim 3 wherein:

said paging system transmits said command message addressed to said particular paging device in said particular one of said service areas multiple times in response to each said registration communicated by a user.

9. A method of operating a paging system as recited in claim 4 wherein:

said paging system transmits said command message addressed to said particular paging device in said particular one of said service areas multiple times in response to each said registration communicated by a user.

10. In a paging system using pagers comprising a plurality of service areas, a method of operating a pager of a particular user, said pager being of the type having a predetermined pager specific capcode and a programmable alternate capcode stored in an alternate capcode memory, comprising the steps of:

assigning a unique paging device address code to each of said plurality of service areas;

storing said unique paging device address code associated with a home service area of said user in said alternate capcode memory;

in each particular one of said plurality of service areas, repetitively broadcasting a set of reminder messages requesting recipient registration, said set of reminder messages including at least one message addressed to said paging device address code for each of said plurality of service areas except said particular one of said plurality of service areas causing said pager to reproduce a particular one of said set of reminder messages that is addressed to said unique paging device address code stored in said alternate capcode memory in response to each receipt thereof; and transmitting a command message addressed to said pager in said particular one of said service areas, commanding said pager device to store said unique paging device address code for said particular one of said service areas in said alternate capcode memory in response to each said registration communicated by a user.

11. A method of operating a paging system as recited in claim 10 wherein:

said step of repetitively broadcasting said set of reminder messages requesting recipient registration is performed at regular intervals.

12. A method of operating a paging system as recited in claim 10 wherein:

said step of transmitting said command message addressed to said pager in said particular one of said service areas occurs multiple times in response to each said registration communicated by a user.

13. A method of operating a paging system as recited in claim 10 wherein:

said step of causing said pager to reproduce said particular one of said set of reminder messages is performed by causing visible indicia on said pager to display said reminder message.

* * * * *